United States Patent
Koenig et al.

(10) Patent No.: US 9,932,075 B1
(45) Date of Patent: Apr. 3, 2018

(54) SPARE WHEEL ASSEMBLY FOR A VEHICLE

(71) Applicant: FORD GLOBAL TECHNOLOGIES, LLC, Dearborn, MI (US)

(72) Inventors: Neal Koenig, New Hudson, MI (US); Luis Felipe Sanchez Curiel Nyssen, Atizapan (MX); Laura Imelda Luengo Herrero, Southfield, MI (US); Brenna Liu, Nanjing (CN); Alexia Cassandra De Anda Martinez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/473,877

(22) Filed: Mar. 30, 2017

(51) Int. Cl.
*B62D 43/00* (2006.01)
*B62D 43/10* (2006.01)

(52) U.S. Cl.
CPC ........... *B62D 43/005* (2013.01); *B62D 43/10* (2013.01)

(58) Field of Classification Search
CPC .............................. B62D 43/005; B62D 43/10
USPC ............................ 296/37.2, 37.3; 224/42.24
See application file for complete search history.

(56) References Cited

U.S. PATENT DOCUMENTS

| | | | | |
|---|---|---|---|---|
| 5,429,285 | A * | 7/1995 | Kim | B60R 11/06 206/373 |
| 5,639,196 | A * | 6/1997 | Murase | B62D 43/10 411/349 |
| 6,082,803 | A * | 7/2000 | Klueger | B62D 43/10 224/42.24 |
| 6,250,524 | B1 * | 6/2001 | Maruyama | B62D 43/10 224/42.13 |
| 7,036,697 | B2 | 5/2006 | Hwang et al. | |
| 7,708,175 | B2 | 5/2010 | Edwards | |
| 9,573,534 | B2 * | 2/2017 | Hibino | B60R 11/06 |
| 2005/0097992 | A1 * | 5/2005 | Katou | B25B 13/48 81/10 |
| 2011/0127799 | A1 * | 6/2011 | Parkinson | B60R 11/06 296/191 |
| 2014/0054334 | A1 | 2/2014 | Francis et al. | |
| 2016/0280151 | A1 * | 9/2016 | Engerman | B60R 11/06 |

FOREIGN PATENT DOCUMENTS

JP          2001146137 A         5/2001

* cited by examiner

*Primary Examiner* — Gregory Blankenship
(74) *Attorney, Agent, or Firm* — Vichit Chea; Brooks Kushman, P.C.

(57) ABSTRACT

A spare wheel assembly includes a spare-wheel cap having a core, and raised fins radially extending from the core toward a perimeter of the cap to form a cross and configured to provide gripping portions for rotating the cap. The spare wheel assembly further includes an ornament-removal tool having a handle and a longitudinal member extending therefrom. Some of the fins define recesses configured to receive and retain the handle and member to removably secure the tool to the cap.

20 Claims, 4 Drawing Sheets

SPARE WHEEL ASSEMBLY FOR A VEHICLE

TECHNICAL FIELD

The present disclosure relates to spare wheel retainers, tools, and assemblies for motor vehicles. In particular, the present disclosure relates to spare-wheel caps and ornament-removal tools removably coupled thereto.

BACKGROUND

Motor vehicles may include spare wheel assemblies having a spare-wheel cap and an ornament-removal tool removably coupled thereto. The ornament-removal tool may be positioned such that other spare wheel parts need to be removed before accessing the tool, which may be the first tool needed to remove an existing wheel from the vehicle.

SUMMARY

According to an embodiment, a spare wheel assembly includes a spare-wheel cap having a core, and raised fins radially extending from the core toward a perimeter of the cap to form a cross and configured to provide gripping portions for rotating the cap. The spare wheel assembly further includes an ornament-removal tool having a handle and a longitudinal member extending therefrom. Some of the fins define recesses configured to receive and retain the handle and member to removably secure the tool to the cap.

According to another embodiment, a spare wheel assembly includes a spare-wheel cap having a base, a raised central core extending from the base, and fins radially extending from the core toward a perimeter of the cap to provide gripping portions for rotating the cap. The spare wheel assembly further includes an ornament-removal tool having a handle and a longitudinal member extending therefrom. The fins define recesses configured to receive and retain the handle and member to removably secure the tool to the cap.

According to another embodiment, a spare wheel retainer includes a spare-wheel cap having a base defining a central axis, and fins projecting away from the base in a direction of the axis, configured to provide gripping portions for rotating the cap, and defining recesses configured to receive and retain portions of an ornament-removal tool to secure the tool to the cap.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
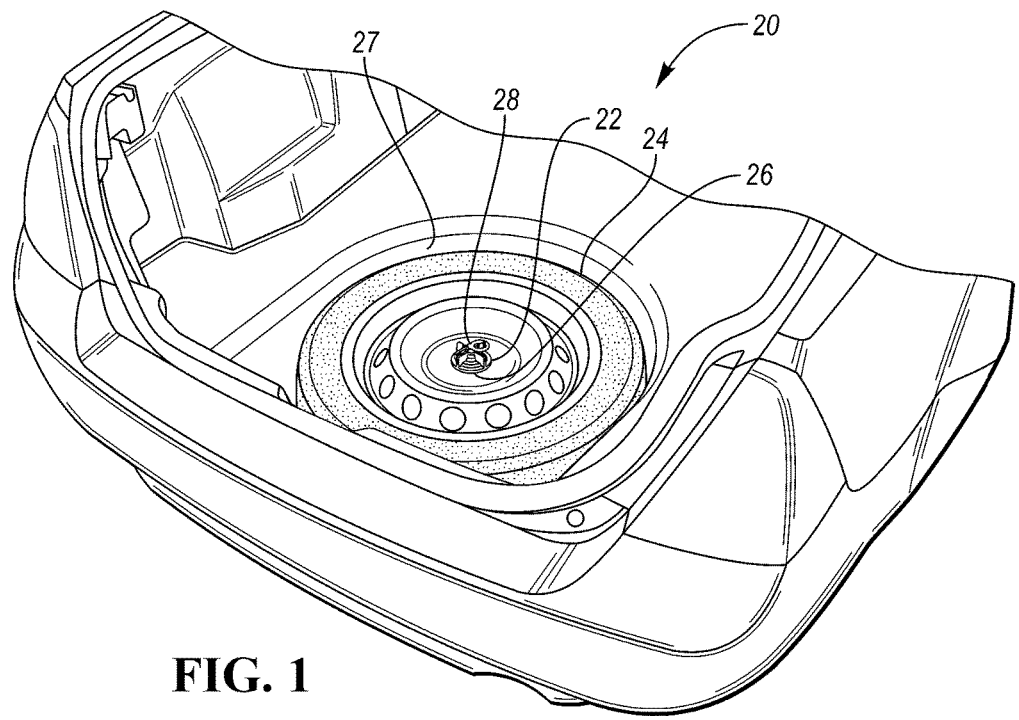
FIG. 1 is a perspective view of a trunk of a vehicle illustrating a spare wheel assembly of the vehicle in accordance with an embodiment of the instant disclosure.

FIG. 1 is a perspective view of a trunk of a vehicle 20 illustrating a spare wheel assembly 22 of the vehicle 20 in accordance with an embodiment of the instant disclosure. The spare wheel assembly 22 includes a spare wheel 24, a spare-wheel cap 26, and an ornament-removal tool 28 removably coupled to the cap 26. The cap 26 is used to secure the spare wheel 24 within a spare-wheel cavity 27 of the vehicle 20. The ornament-removal tool 28 is used to remove an ornament (i.e., hubcab, wheel cover, or center cap) from an existing wheel on the vehicle 20 upon removing the existing wheel. Because the ornament-removal tool 28 is the first (or one of the first) tools needed upon changing wheels of the vehicle 20, it may be desirable to position the tool 28 in an accessible area such that the tool 28 can be removed quickly and easily.

In the illustrated embodiment, the spare wheel assembly 22 is illustrated as being within the trunk of the vehicle 20. However, the spare wheel assembly 22 may be disposed in other areas of the vehicle 20 in accordance with other embodiments. The spare wheel 24 may be disposed on its side as illustrated such that a threaded bolt secured within the spare-wheel cavity 27 extends upwards through a central hole of the wheel 24 to couple with the cap 26 of the assembly 22. Although the spare wheel 24 is illustrated as being stored on its side, the spare wheel 24 may be stored in other orientations within the spirit and scope of the instant disclosure.

Figure 2:
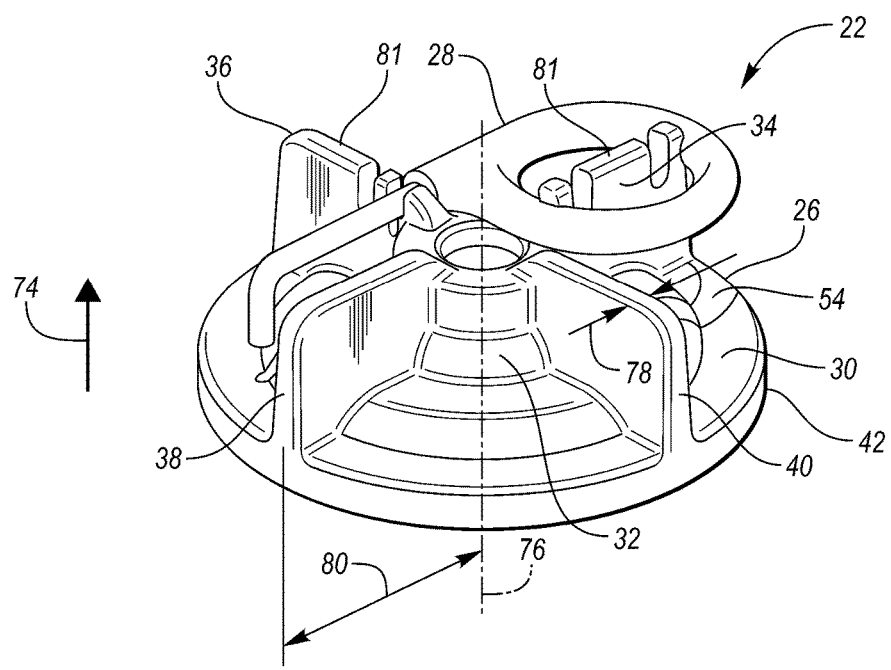
FIG. 2 is a perspective view of a spare-wheel cap and ornament-removal tool of the spare wheel assembly of FIG. 1 in an assembled condition.
Figure 3:
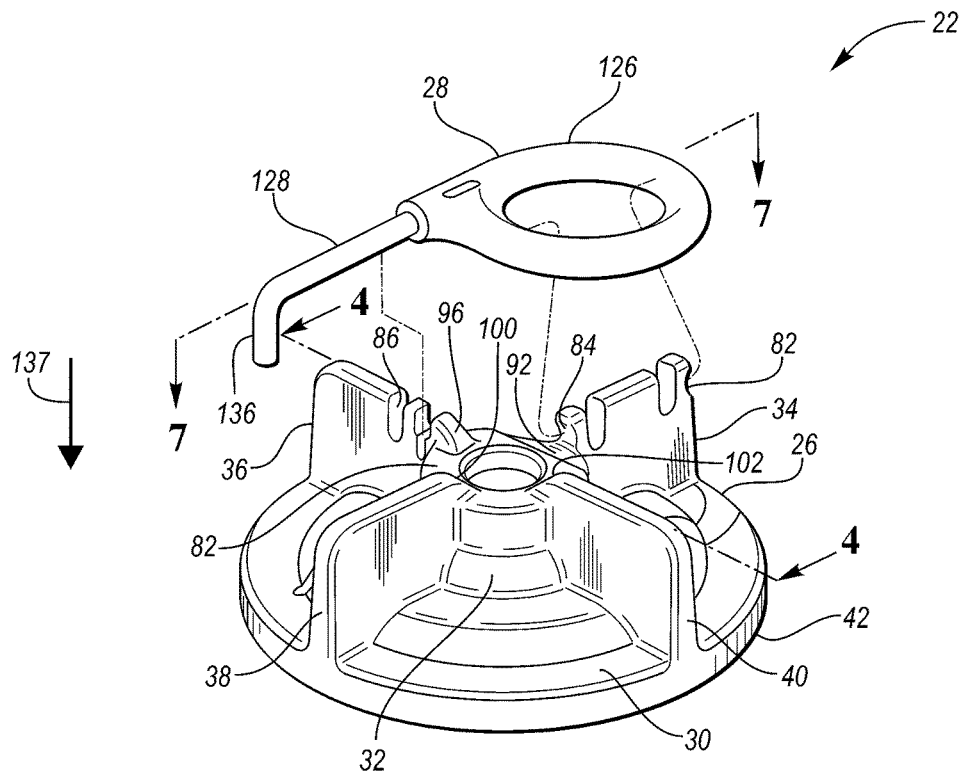
FIG. 3 is an exploded view of the spare-wheel cap and ornament-removal tool of FIG. 2.

FIG. 2 is a perspective view of the spare-wheel cap 26 and ornament-removal tool 28 of the spare wheel assembly 22 of FIG. 1 in an assembled condition. FIG. 3 is an exploded view of the spare-wheel cap 26 and ornament-removal tool 28 of FIG. 2. In the illustrated embodiment, the cap 26 has a base 30, a raised central core 32 extending away from the base 30, and fins 34, 36, 38, 40 radially extending from the core 32 toward a perimeter 42 of the cap 26 to form a cross. In some embodiments, the cap 26 may comprise plastic, glass-filled nylon, polyoxymethylene (POM), polypropylene, or the like.

Figure 4:
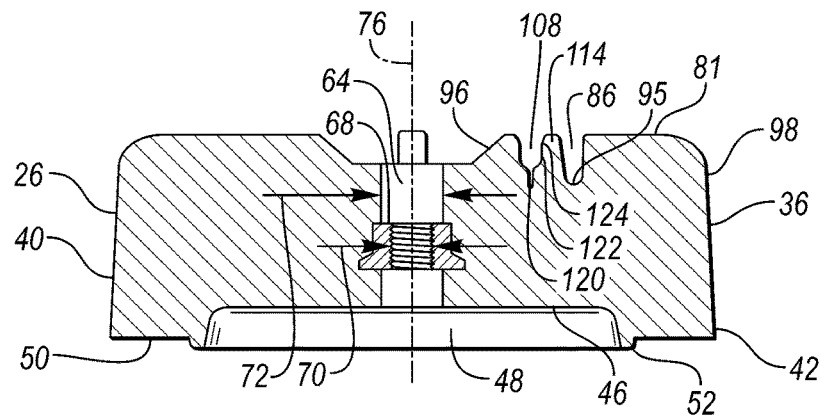
FIG. 4 is a cross-sectional view of the spare-wheel cap taken along line 4-4 of FIG. 3.
Figure 5:
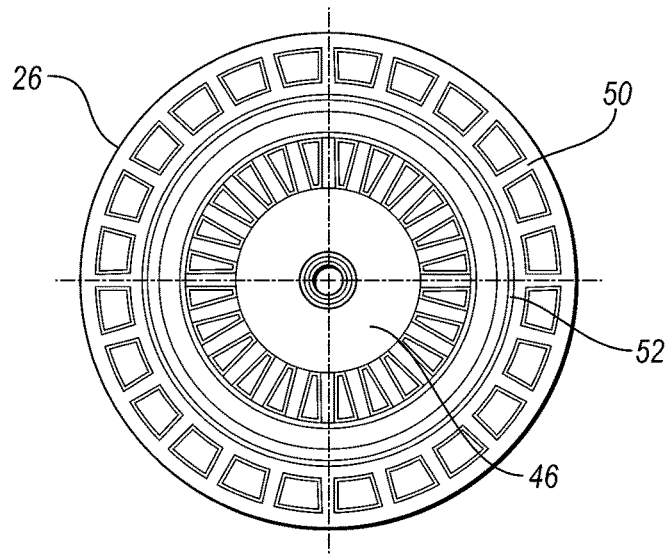
FIG. 5 is a bottom plan view of the spare-wheel cap of FIG. 2.
Figure 6:
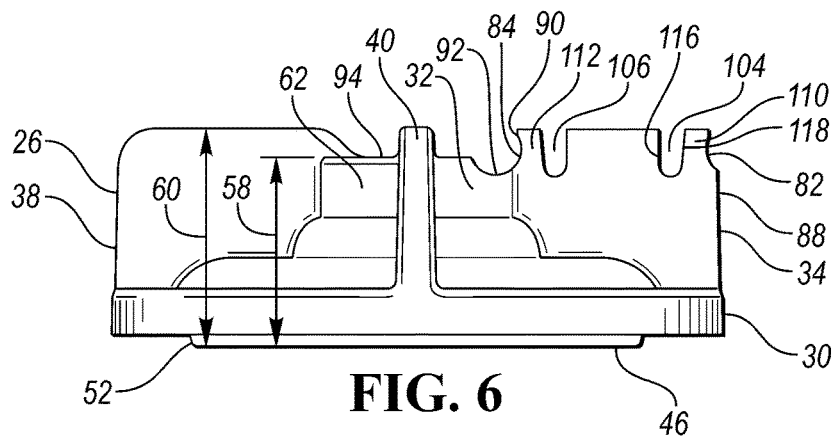
FIG. 6 is a side elevational view of the spare-wheel cap of FIG. 2.

FIG. 4 is a cross-sectional view of the spare-wheel cap 26 taken along line 4-4 of FIG. 3. FIG. 5 is a bottom plan view of the spare-wheel cap 26 of FIG. 2. FIG. 6 is a side elevational view of the spare-wheel cap 26 of FIG. 2. The base 30 of the cap 26 is circular and generally disc-shaped. The base 30 serves as a bottom support for the fins 34, 36, 38, 40 and is adapted to cooperate with a center portion 44 of the wheel 24. In particular, the base 30 has an underside 46 opposite the fins 34, 36, 38, 40, the underside 46 being shaped to cooperate with the center portion 44 of the spare wheel 24. In the illustrated embodiment, the base 30 has a circular cavity 48 formed in the underside 46 for receiving the center portion 44 of the spare wheel 24. The base 30 also has a circular recessed area 50 adjacent the perimeter 42 of the cap 26. A lip 52 that projects away from the fins 34, 36, 38, 40, defines the recessed area 50, and is adjacent to the cavity 48. When the cap 26 is secured to the wheel 24, the recessed area 50 interfaces with the hub of the center portion 44 of the wheel 24. The lip 52 acts as a locator for aligning the cap 26 with the center portion 44 of the wheel 24, wherein the lip 52 may be received within a groove formed in the hub of the wheel 24. The bores formed in the underside 46 may reduce the overall weight of the cap 26 and aid in manufacturing the cap 26. In other embodiments, the recessed area 50 and the portion of the underside 46 disposed radially inwardly of the lip 52 may be planar without bores formed therein. The base 30 may also include a tool-position indicator 54 (FIG. 2) to indicate the position of the tool 28 for coupling to the cap 26. In the illustrated embodiment, the tool-position indicator 54 is an outline of the tool 28 etched into a top surface 56 of the cap 26.

The core 32 of the cap 26 is centrally located relative to the base 30 and projects upwards away from the base 30 to a height 58 less than a height 60 of the fins 34, 36, 38, 40 to allow space for the tool 28. The core 32 has an outer surface 62 disposed within the perimeter 42 of the cap 26. The outer surface 62 is stepped such that it increases toward the base 30 of the cap 26 in steps. In other embodiments, the core 32 is cylindrical with one uniform outer diameter. The core 32 defines a central hole 64 that extends through a length 66 of the core 32. Within the central hole 64 is a threaded nut 68 for receiving a bolt or stud to secure the cap 26 to the spare wheel 24. In the illustrated embodiment, the nut 68 has an inner diameter 70 less than a diameter 72 of the central hole 64. The nut 68 may be positioned elsewhere within the core 32 or cavity 48 of the base 30. In some embodiments, the nut 68 comprises metal, such as steel, or plastic. Furthermore, the central hole 64 may be shaped and threaded to receive the bolt itself without the use of a nut 68 or other separate element. The core 32 may be omitted or have a smaller or greater height than the height 58 illustrated.

With reference to FIGS. 2-3, the fins 34, 36, 38, 40 are configured to provide gripping portions for rotating the cap 26. The fins 34, 36, 38, 40 project away from the base 30 in a direction 74 of a central axis 76 defined by the base 30. In the illustrated embodiment, the cap 26 has four fins 34, 36, 38, 40, each fin being angularly spaced from adjacent fins by ninety degrees relative to the axis 76. One of ordinary skill in the art will understand that more or less fins may be used, and the fin(s) may be oriented in number of different ways relative to one another. Each of the fins 34, 36, 38, 40 has the same overall height 60 relative to the base 30 and a width 78. In one embodiment, the height 60 of the fins is greater than 20 mm. In one embodiment, the width 78 of the fins 34, 36, 38, 40 is greater than 3 mm. In some embodiments, the fins 34, 36, 38, 40 have different widths 78. Each of the fins 34, 36, 38, 40 radially extends to the same radial distance 80 relative to the axis 76 (i.e., to the perimeter 42). In one embodiment, the radial distance 80 is greater than 30 mm. The height 60 of the fins 34, 36, 38, 40 is greater than the height 58 of the core 32 to allow space for the tool 28 such that the tool 28 lies flush with or below top edge surfaces 81 of the fins 34, 36, 38, 40 when the tool 28 is secured to the cap 26. Moreover, each of the fins 34, 36, 38, 40 connects with the core 32. In the illustrated a portion of each of the fins 34, 36, 38, 40 connects with a top surface 82 of the core 32 opposite the base 30. In some embodiments, the fins 34, 36, 38, 40 may be non-uniform in height 58 and/or radial distance 80. The fins 34, 36, 38, 40 may also extend in a non-radial direction relative to the axis 76. In some embodiments, the fins 34, 36, 38, 40 are disconnected from the core 32.

As best seen in FIGS. 4 and 6, some of the fins 34, 36 define recesses 82, 84, 86 configured to receive and retain portions of the tool 28 to removably secure the tool 28 to the cap 26. The recesses 82, 84, 86 are formed in an adjacent pair of the fins. The fin 34 has an outer side wall 88 disposed opposite the core 32 and central axis 76. The outer side wall 88 is disposed parallel to the central axis 76. The recess 82 is formed in the outer side wall 88 and has an arcuate, partial semicircular shape to accommodate an arcuate portion of the tool 28. In the illustrated embodiment, the recess 82 extends uniformly through the fin 34. One of ordinary skill in the art will understand that the recess 82 may take on a variety of different shapes and sizes within the spirit and scope of the instant disclosure. For example and without limitation, the recess 82 may have a square cross-sectional shape.

The fin 34 further has an inner side wall 90 disposed opposite the outer side wall 88 and adjacent the core 32. The recess 84 is formed in the inner side wall 90 and has an arcuate, partial semicircular shape to accommodate an arcuate portion of the tool 28. In the illustrated embodiment, the recess 84 extends through the fin 34. One of ordinary skill in the art will understand that the recess 84 may take on a variety of different shapes and sizes within the spirit and scope of the instant disclosure. For example and without limitation, the recess 84 may have a square cross-sectional shape.

As best seen in FIGS. 3 and 6, the recess 84 combines with a recess 92 defined by the core 32 to receive a portion of the tool 28. The recess 92 of the core 32 is formed in a top surface 94 of the core 32 to one side of the central hole 64. The recess 92 is arcuate and extends across the top surface 94 of the core 32 past both ends of the recess 84 of the fin 34. In another embodiment, the ends of the recess 92 are curved in a direction perpendicular to the axis 76 toward the fin 34 to accommodate the curvature of the tool 28 as it rests in the cap 26. The recesses 84, 92 generally form a semicircle for receiving and retaining the tool 28. As illustrated, the recesses 82, 84, 92 are axially aligned (relative to the axis 76) such that the tool 28 lies horizontally in a direction perpendicular to the axis 76.

As best seen in FIG. 4, the recess 86 is formed in the top edge surface 81 of the fin 36. The top edge surface 81 of the fin 36 extends perpendicularly to the axis 76. A bottom curved portion 95 of the recess 86 is arcuate to receive an arcuate portion of the tool 28. As the recess 86 extends from the bottom curved portion 95 toward the top edge surface 81 of the fin 36, the recess 86 slopes outwardly slightly from both ends of the bottom curved portion 95 to aid in insertion and removal of the tool 28. As illustrated the recess 86 is disposed between an inner side wall 96 and outer side wall 98 of the fin 36, the inner side wall 96 being disposed adjacent the core 32 and opposite the outer side wall 98. As shown in FIG. 3, inner side walls 96, 100, 102 of the fins 36, 38, 40, respectively extend upwards from the top surface 82 of the core 32 at an angle less than ninety degrees in the illustrated embodiment.

As best seen in FIGS. 4 and 6, adjacent to recesses 82, 84, 86 are recesses 104, 106, 108. Recesses 104, 106, 108 are defined by the fins 34, 36 and are used to decrease the stiffness of portions of the fins 32, 34 adjacent to recesses 82, 84, 86. The recess 104 is configured to decrease the stiffness of the portion 110 of fin 34; the recess 106 is configured to decrease the stiffness of the portion 112 of fin 34; and the recess 108 is configured to decrease the stiffness of the portion 114 of fin 36.

Referring to FIG. 6, the recess 104 is formed in the top edge surface 81 of the fin 34 adjacent to the recess 82. A bottom curved portion of the recess 104 opposite the top edge surface 81 is arcuate. Sides 116, 118 of the recess 104 extend from the bottom curved portion upward to the top edge surface 81 of the fin 34. The sides 116, 118 are generally planar. The side 116 is disposed parallel to the axis 76, and the side 118 slopes outwardly slightly from the bottom curved portion such that the portion 110 of the fin 34 is less stiff near the top edge surface 81. In the illustrated embodiment, the recess 104 extends downward a distance away from the top edge surface 81 greater than the recess 82 extends.

The recess 106 is also formed in the top edge surface 81 of the fin 34 but adjacent to the recess 84 of the fin 34. In the illustrated embodiment, the recess 106 is a mirror image of the recess 104 such that the side of the recess 106 adjacent the recess 84 slopes outwardly slightly from the bottom curved portion to decrease stiffness of the portion 112 of the fin 34 near the top edge surface 81. In one embodiment, bottoms of the recesses 92, 104, 106, are disposed at the same height relative to the bottom of the cap 26.

Referring to FIG. 4, the recess 108 is formed in the top edge surface 81 of the fin 36. The recess 108 has a bottom narrow portion 120 opposite the top edge surface 81. The recess 108 increases in size toward the top edge surface 81 of the fin 36 from the bottom narrow portion 120; the recess 108 funnels inwardly from the top edge surface 81 toward the bottom narrow portion 120. A mid section 122 of the recess 108 has sides that are generally planar and oriented parallel to the axis 76. A bottom of the mid section 122 connecting with the sides is arcuate and has a semicircular shape that connects with the bottom narrow portion 120. The mid section 122 extends upwards and connects with a top section 124 of the recess 108. The top section 124 funnels outwardly from the mid section 122 toward the top edge surface 81 of the fin 36. In one embodiment, the bottom of the recess 108 is disposed at the same height (relative to the bottom of the cap) as recesses 92, 104, 106.

One of ordinary skill in the art will understand that the recesses 104, 106, 108 may take on a variety of different shapes and sizes within the spirit and scope of the instant disclosure. Furthermore, more or less recesses 104, 106, 108 may be used to decrease the stiffness of the portions 110, 112, 114 of the fins 34, 36. In some embodiments, the portions of the fins 34, 36 surrounding the recesses 82, 84, 86 may comprise a more flexible material such that the tool 28 may be removably coupled to the cap 26 with ease.

Figure 7:
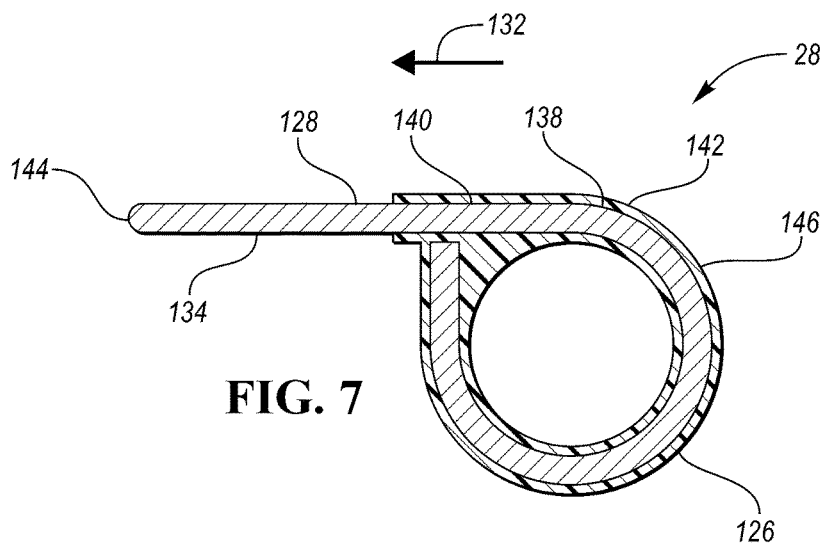
FIG. 7 is a cross-sectional view of the ornament-removal tool taken along line 7-7 of FIG. 3.

FIG. 7 is a cross-sectional view of the ornament-removal tool 28 taken along line 7-7 of FIG. 3. The tool 28 has a handle 126 and a longitudinal member 128 extending from the handle 126. In the illustrated embodiment, the handle 126 is arcuate and forms a ring, and the longitudinal member 128 extends in a direction 130 that is generally tangential to the ring such that the handle 126 is disposed on one side of the longitudinal member 128 in a direction 132 perpendicular to the member 128. In other embodiments, the handle 126 is disposed on both sides of the longitudinal member 128 such that the longitudinal member 128 extends from a midpoint of the handle 126, for example. As illustrated, the tool 28 is formed from one tubular body 134 that is bent and curved to form the longitudinal member 128 and the handle 126. The tubular body 134 has a circular cross section. As shown in FIG. 3, at one end of the longitudinal member 128 is a hook portion 136 that extends in a direction 137 perpendicular to the longitudinal member. The tool 28 may take on a variety of different shapes and configurations depending on the particular application and how the ornament is removed from the wheel.

With continued reference to FIG. 7, the handle 126 of the tool 28 may extend from points 138, 140 along the longitudinal member 128. The point 138 is adjacent to an end 142 of the longitudinal member 128, and the point 140 is axially offset a distance from the point 138 toward another end 144 of the longitudinal member 128. In the illustrated embodiment, the handle 126 is defined by the ring section of the tubular body 134 and a casing 146 disposed over the tubular body 134 to increase the diameter of the handle 126 for comfort and improved gripping. The tubular body 134 may comprise metal, such as steel, and the casing 146 may comprise plastic or the like.

With reference to FIGS. 2 and 3, the handle 126 is received and retained in the recesses 82, 84, 92, and the longitudinal member 128 is received and retained in the recess 86 to removably secure the tool 28 to the cap 26. In particular, opposite sides of the handle 126 are received and retained in the recesses 82, 84, 92, and a middle portion of the longitudinal member 128 is received and retained in the recess 86. One of ordinary skill in the art will understand that the recesses and tool may be designed to have different shapes within the spirit and scope of the instant disclosure. For example and without limitation, the handle 126 may be semicircular in shape rather than forming a full circle or ring. Alternatively, the portions of handle 126 may perpendicularly extend from points 138, 140 on the longitudinal member 128 and not couple together at a point opposite the longitudinal member 128. Furthermore, although the handle 126 is illustrated as a ring, the handle 126 may extend from only one point along the longitudinal member 128 and be received within a recess formed in the one of the top edge surfaces 81 of the fins 34, 36, 38, 40. Lastly, the tool 28 may be removably coupled to more or less than two fins of the cap 26.

Figure 8:
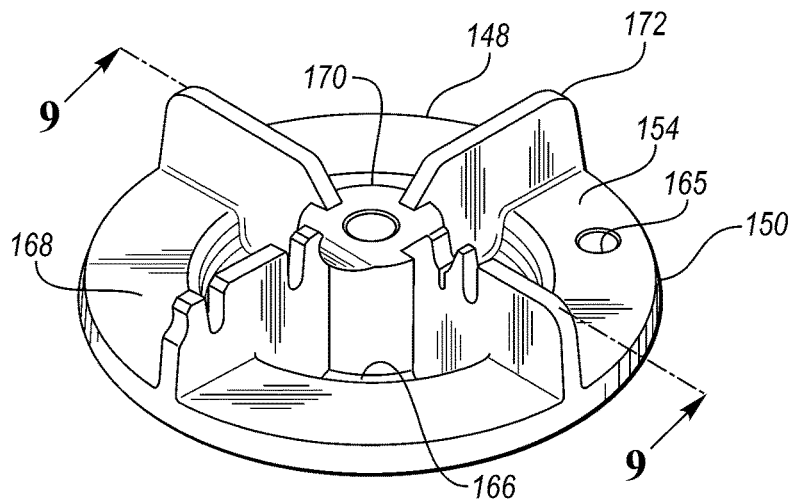
FIG. 8 is a spare-wheel cap that may be used in the spare wheel assembly of FIG. 1 in accordance with another embodiment of the instant disclosure.
Figure 9:
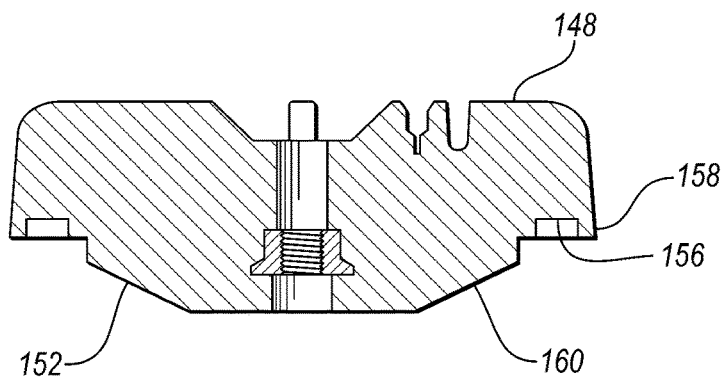
FIG. 9 is a cross-sectional view of the spare-wheel cap taken along line 9-9 of FIG. 8.
Figure 10:
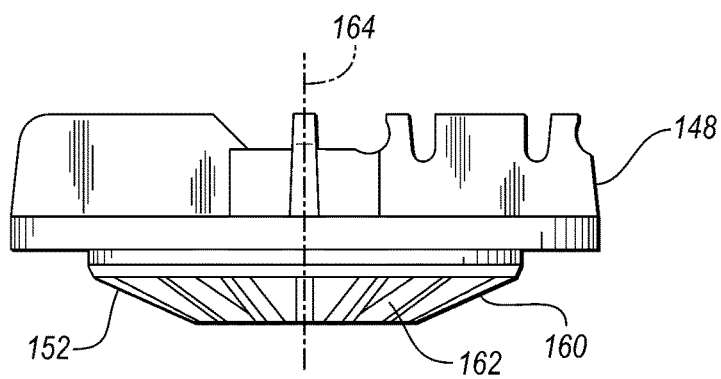
FIG. 10 is a side elevational view of the spare-wheel cap of FIG. 8.

FIG. 8 is a spare-wheel cap 148 that may be used in the spare wheel assembly 22 of FIG. 1 in accordance with another embodiment of the instant disclosure. FIG. 9 is a cross-sectional view of the spare-wheel cap 148 taken along line 9-9 of FIG. 8. FIG. 10 is a side elevational view of the spare-wheel cap 148 of FIG. 8. The spare-wheel cap 148 of FIGS. 8-10 may be used to accommodate a spare wheel with a different center portion. Furthermore, the tool 28 discussed hereinabove may be removably coupled to the spare-wheel cap 148. The spare-wheel cap 148 of FIGS. 8-10 is similar to the spare-wheel cap 26 illustrated in FIGS. 2-6. The differences between the two illustrated embodiments will now be discussed.

The spare-wheel cap 148 includes a base 150 with an underside 152 and a topside 154 opposite the underside 152. The underside 152 of the base 150 includes a recessed area 156 within a perimeter 158 of the cap 148 outside a conical area 160 of the underside 152. The conical area 160 defines spokes 162 that extend radially outwardly from a central axis 164 with recesses formed in the underside 152 between the spokes 162. The recesses between the spokes 162 and in recessed area 156 may reduce the overall weight of the cap 148 and aid in manufacturing. The underside 152 is shaped cooperate with a hub or center portion of a different spare wheel. The cap 148 illustrated in FIGS. 8-10 may be used for a wheel that is positioned at a different height relative to the bolt or stud that is received within the central hole of the cap 148. In such embodiments, the nut may be positioned at a lower height relative to the bottom of the cap 148. Furthermore, the base 150 may also include a tool-position indicator 165 (FIG. 8) to indicate the position of the tool 28 for coupling to the cap 26. In the illustrated embodiment, the tool-position indicator 165 is a circular recess formed into a top surface of the cap 148 for receiving a tip of the hook portion of the tool.

The topside 154 of the base 150 has a central portion 166 that converges with an outer raised portion 168. A core 170 of the cap 148 extends upwards from the central portion 166. Fins 172 of the cap 148 are coupled to both the central and outer raised portions 166, 168.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Furthermore, details disclosed in connection with one embodiment apply to other disclosed embodiments as well, unless specified otherwise.

What is claimed is:

1. A spare wheel assembly comprising:
   a spare-wheel cap having a core, and raised fins radially extending from the core toward a perimeter of the cap to form a cross and configured to provide gripping portions for rotating the cap; and
   an ornament-removal tool having a handle and a longitudinal member extending therefrom, wherein some of the fins define recesses configured to receive and retain the handle and member to removably secure the tool to the cap.

2. The spare wheel assembly of claim 1, wherein the recesses are such that the ornament-removal tool is flush with or below top edge surfaces of the raised fins when the tool is secured to the cap.

3. The spare wheel assembly of claim 1, wherein each of the raised fins is angularly spaced from adjacent fins by ninety degrees.

4. The spare wheel assembly of claim 1, wherein the recesses are formed in an adjacent pair of the raised fins.

5. The spare wheel assembly of claim 1, wherein one of the recesses is formed in an outer side wall of one of the raised fins, and wherein the outer side wall is disposed opposite the core.

6. The spare wheel assembly of claim 5, wherein another of the recesses is formed in an inner side wall disposed opposite the outer side wall of the raised fin and adjacent the core.

7. The spare wheel assembly of claim 1, wherein one of the recesses is formed in a top surface of one of the raised fins.

8. The spare wheel assembly of claim 1, wherein the core defines a recess formed in a top surface of the core, the recess of the core being configured to receive and retain a portion of the handle.

9. The spare wheel assembly of claim 1, wherein the core extends away from a base of the cap, and wherein the raised fins project away from the base.

10. The spare wheel assembly of claim 9, wherein an underside of the base is shaped to rest on a center portion of a spare wheel.

11. The spare wheel assembly of claim 1, wherein the handle is arcuate.

12. The spare wheel assembly of claim 11, wherein the handle forms a ring, and wherein the longitudinal member extends in a direction that is generally tangential to the ring.

13. A spare wheel assembly comprising:
    a spare-wheel cap having a base, a raised central core extending from the base, and fins radially extending from the core toward a perimeter of the cap to provide gripping portions for rotating the cap; and
    an ornament-removal tool having a handle and a longitudinal member extending therefrom, wherein the fins define recesses configured to receive and retain the handle and member to removably secure the tool to the cap.

14. The spare wheel assembly of claim 13, wherein one of the recesses is formed in an outer side wall of one of the fins, and wherein the outer side wall is disposed opposite the core.

15. The spare wheel assembly of claim 13, wherein one of the recesses is formed in a top surface of one of the fins.

16. The spare wheel assembly of claim 13, wherein the ornament-removal tool has a handle and a longitudinal member extending from the handle, and wherein the handle is disposed on one side of the longitudinal member in a direction perpendicular to the member.

17. The spare wheel assembly of claim 16, wherein the handle extends from first and second points along the longitudinal member, the first point being adjacent to an end of the longitudinal member, and the second point being axially offset a distance from the first point towards another end of the longitudinal member.

18. A spare wheel retainer comprising:
    a spare-wheel cap having a base defining a central axis, and fins projecting away from the base in a direction of the axis, configured to provide gripping portions for rotating the cap, and defining recesses configured to receive and retain portions of an ornament-removal tool to secure the tool to the cap.

19. The spare wheel retainer of claim 18, wherein one of the recesses is formed in an outer side wall of one of the fins, the outer side wall being disposed opposite the central axis.

20. The spare wheel retainer of claim 19, wherein another of the recesses is formed in an inner side wall disposed opposite the outer side wall of the fin and adjacent the central axis.

* * * * *